2,878,234
EPOXY RESINS INCLUDING AN IMIDAZOLINE CURING AGENT

Lowell E. Peterson, Anoka, Minn., assignor to General Mills, Inc., a corporation of Delaware No Drawing. Application April 1, 1957
Serial No. 649,608

5 Claims. (Cl. 260—47)

This invention relates to novel compositions containing epoxy resins and diimidazolines derived from aliphatic dicarboxylic acids.

Various coreactants with epoxy resins are now commercially available. Each of these has certain advantages and disadvantages, and their applications are limited accordingly. The diimidazoline coreactants taught by this invention have many advantages and improvements not heretofore obtainable by the use of known coreactants. Among these advantages are high heat distortion temperatures, non-volatility, low viscosity, and low toxicity. Other advantages will become apparent upon reading the subsequent specification.

Basically, the compositions of this invention are those which contain an epoxy resin having an epoxy equivalency of at least 100 and an imidazoline of the general structural formula,

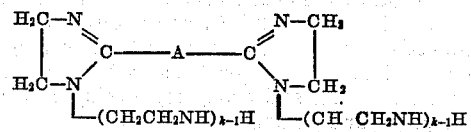

where $k$ is an integer and A is a straight chained hydrocarbon radical i. e., a straight chained hydrocarbon with hydrogen removed from each terminal carbon atom, preferably an alkylene radical.

The preferred epoxy resins (glycidyl ethers) employed in this invention are complex polymeric reaction products of polyhydric phenols with polyfunctional halohydrins and/or glycerol dichlorohydrin. The products thus obtained contain terminal epoxy groups. A large number of epoxy resins of this type are disclosed in Greenlee Patents 2,585,115 and 2,589,245. Several of these resins are readily available commercial products.

Typical polyhydric phenols useful in the preparation of epoxy resins include resorcinol and various bisphenols resulting from the condensation of phenol with aldehydes and ketones such as formaldehyde, acetaldehyde, acetone, methyl ethyl ketone, and the like. A typical epoxy resin is the reaction product of epichlorohydrin and 2,2-bis(p-hydroxy phenyl)propane(bisphenol A), the resin having the following theoretical structural formula,

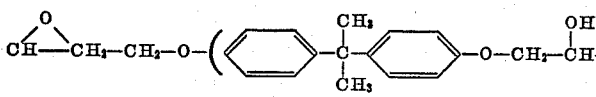 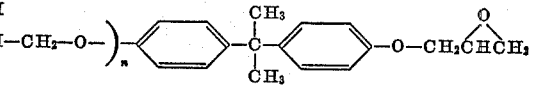

where $n$ is 0 or an integer up to 10. Generally speaking, $n$ will be no greater than 2 or 3 and is preferably 1 or less.

Epoxy resins may be characterized further by reference to their epoxy equivalent, the epoxy equivalent of pure epoxy resins being the mean molecular weight of the resin divided by the mean number of epoxy radicals per molecule, or in any case the number of grams of epoxy resin equivalent to one mole of the epoxy group or one gram equivalent of epoxide. For the purposes of this invention epoxy resins having an epoxy equivalency of 100 to 550 are suitable, the preferred range being 165 to 225.

The diimidazolines employed in this invention are derived from aliphatic dibasic acids and polyamines. Suitable dibasic acids are as follows: adipic, sebacic, azelaic, glutaric, succinic, oxalic, malonic, maleic, and so forth. Preferred acids correspond to the general formula $HOOC(CH_2)_g COOH$ where $g$ is zero or an integer less than 11.

Polyamines may be employed in this invention having the following structural formula $H_2N(CR_2CR_2NH)_k H$ where $k$ is an integer less than 6 and R is hydrogen or a lower alkyl radical. Illustrative polyamines are ethylenediamine, diethylene triamine, triethylene tetramine, tetraethylene pentamine, di-1,2-propane triamine, and so forth or mixtures thereof.

This invention may be illustrated further by reference to the following examples in which all "parts" are expressed as parts by weight and all "percentages" are expressed as percent by weight, unless specified otherwise.

Example I

Approximately 3 moles (309 gm.) of diethylene triamine were placed in a one liter round bottom flask equipped with a heating mantle, stirrer, thermometer, and distillation head. The heat was turned on and 1.5 moles (219 gm.) of adipic acid were slowly added so that a large excess of the solid phase (adipic acid) was never present. The mixture was heated to 243° over a six hour period, and distillate (270 gm.) removed through a 12" Vigreux column.

The product had a Brookfield viscosity of 64 poises at 24° C. (#5 spindle, 10 R. P. M.).

15 parts of this diimidazoline were mixed with 85 parts of an epoxy resin derived from bisphenol A and epichlorohydrin having an epoxy equivalency of about 200. The mixture was baked at 150° C. for two hours to produce a casting having a heat distortion temperature of 125° C., a flexural modulus of $4.5 \times 10^5$ p. s. i., and an ultimate flexural strength of 18,100 p. s. i.

Example II

A reaction was carried out between 94 gm. (½ mole) azelaic acid and 103 gm. (1 mole) diethylene triamine as described in Example I except that a maximum temperature of 260° was reached. The product cured Araldite 6010 in a ratio of 15:85 to produce a casting with a heat distortion temperature of 117° C. Araldite 6010 is an epoxy resin reaction product of bisphenol A and epichlorohydrin. It has an epoxy equivalent of approximately 200.

Example III

A reaction between ½ mole (101 gm.) sebacic acid and 1 mole (103 gm.) diethylene triamine was carried out as described in Example I except that the maximum temperature reached was 250° C. The heat distortion temperature of a casting made with 15 parts of the diimidazoline and 85 parts of an epoxy resin derived from bis-phenol A and epichlorohydrin having an epoxy equivalency of about 200 was 107° C.

Example IV

A diimidazoline was made from 1.5 (219 gm.) of adipic acid and 3.0 moles (438 gm.) of triethylene tetramine according to the procedure described in Example I except that a total heating period of three hours was employed and the maximum temperature reached was 275° C. Upon reacting 20 parts of this product with 80 parts of an epoxy resin derived from bis-phenol A and epichlorohydrin having an epoxy equivalency of 200 by baking them as described in Example I, a casting having a heat distortion temperature of 118° C. was obtained.

*Example V*

One mole (116 g.) of maleic acid was slowly added with stirring to two moles (206 gm.) or diethylenetriamine. The mixture was heated with stirring to 192° over a period of four hours while 35 gm. of distillate were collected.

This product was mixed with an epoxy resin derived from bis-phenol A and epichlorohydrin having an epoxy equivalency of about 185 in a ratio of 20 parts to 80 parts epoxy resin and cured at 150° C. for 2 hours. The heat distortion temperature of the casting was 115° C.

*Example VI*

One mole (126 gm.) of oxalic acid dihydrate was added slowly with continuous stirring to two moles (206 gm.) diethylenetriamine in a 500 ml. 3-neck flask. The mixture was heated to 160° within 1½ hours, then slowly heated to 208° over a period of 3 additional hours. A total of 75 gm. of distillate was collected during this period.

A mixture of 15 parts of this product was mixed with 85 parts of an epoxy resin derived from bis-phenol A and epichlorohydrin having an epoxy equivalency of about 185 and heated to 150° for 2 hours. A hard casting having a heat distortion temperature of 110° C. was produced.

It will be appreciated by those familiar with epoxy resin coreactants that the improved heat distortion temperature as shown above is an important discovery and one which is unexpected when compared to the closest analogous coreactants. Accordingly, these compositions are especially useful as glass cloth laminating agents, electrical imbedment compounds, heat resistant coatings, adhesives, and casting compounds. The preferred compositions of this invention are those in which the ratio of coreactants is 2 to 10 parts epoxy resin to one part diimidazoline.

Many modifications and variations of the invention as hereinbefore set forth may be made without departing from the spirit and scope thereof and only such limitations should be imposed as are indicated in the appended claims.

I claim as my invention:

1. A composition of matter containing (a) from 2–10 parts by weight of an epoxy resin having an epoxy equivalency of at least 100 and (b) one part by weight of an imidazoline of the general structural formula,

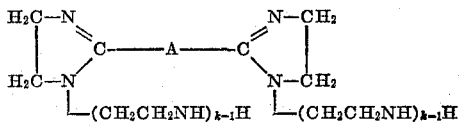

where $k$ is an integer of from 1–5 and A is a straight chained hydrocarbon radical, said epoxy resin being a glycidyl ether of a polyhydric phenol.

2. A composition of matter containing (a) from 2–10 parts by weight of an epoxy resin derived from 2,2-bis (p-hydroxy phenyl) propane and epichlorohydrin having an epoxy equivalent in the range of 100 to 550 and (b) 1 part by weight of an imidazoline of the general structural formula,

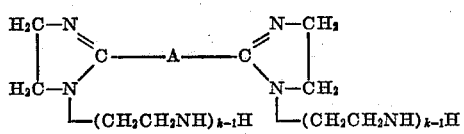

where $k$ is an integer of from 1–5 and A is a straight chained hydrocarbon radical.

3. A process which comprises mixing from 2–10 parts by weight of an epoxy resin having an equivalency of at least 100 and 1 part by weight of an imidazoline of the general structural formula,

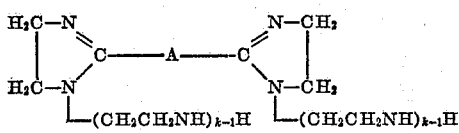

where $k$ is an integer of from 1–5 and A is a straight chained hydrocarbon radical, heating said mixture to a temperature of at least 100° C. and allowing the reaction product to cool to room temperature, thereby obtaining a product having a heat distortion temperature greater than 100° C., said epoxy resin being a glycidyl ether of a polyhydric phenol.

4. The compositions of claim 1 in which A is a hydrocarbon radical corresponding to the formula

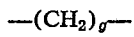

where $g$ is less than 11.

5. The compositions of claim 1 in which A is the radical —$(CH_2)_4$—.

References Cited in the file of this patent

UNITED STATES PATENTS

| | | |
|---|---|---|
| 2,637,716 | Ott | May 5, 1953 |
| 2,712,535 | Fisch | July 5, 1955 |
| 2,743,256 | De Groote | Apr. 24, 1956 |

OTHER REFERENCES

Columbia Encyclopedia, Columbia University Press (1950), page 2196 (2nd edition).